May 31, 1932. N. A. HALLWOOD 1,861,087
SCALE
Filed Feb. 7, 1930
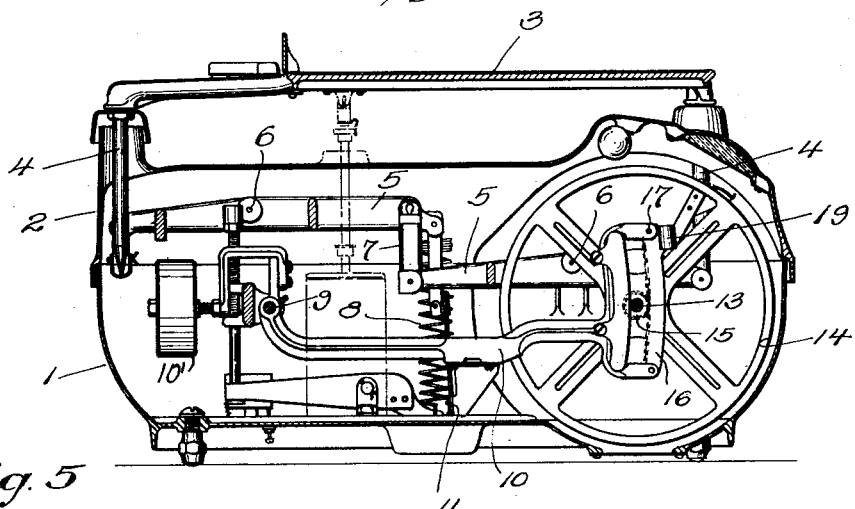
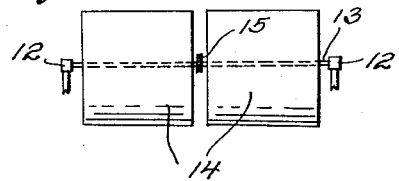
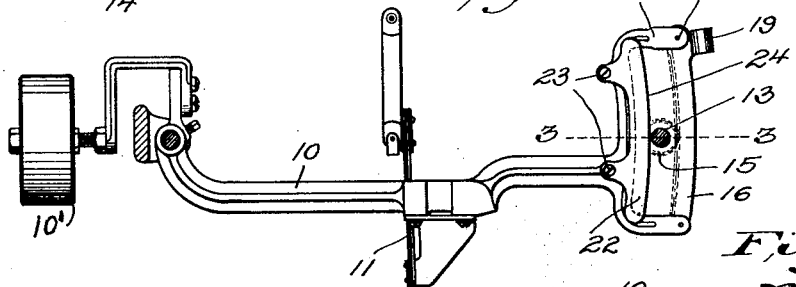
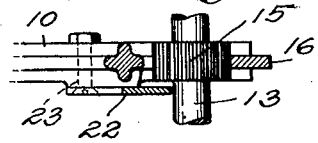
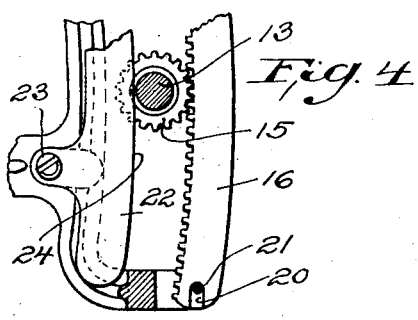
Inventor
N. A. Hallwood
By W. D. McDowell
Attorney Patented May 31, 1932

1,861,087

UNITED STATES PATENT OFFICE

NATHAN A. HALLWOOD, OF COLUMBUS, OHIO

SCALE

Application filed February 7, 1930. Serial No. 426,686.

This invention relates to improvements in weighing scales and has particular reference to the class of weighing scales which embody rotatable weight indicating drums which are mounted for rotation in connection with axially disposed longitudinally extending shafts wherein the shafts are supported at their ends in fixed bearings and the intermediate portion thereof provided with pinions arranged for engagement with rack gears movable to various degrees in response to the commodities placed on the scales for weighing operations. Due to the fact that the rack and pinion mechanism employed for effecting the rotation of the drum shaft is usually located in the center of such shafts whereas the bearings provided for the reception of the shaft are disposed at the outer ends of the latter, there takes place, after a certain amount of wear and use, a lost motion between the teeth of the rack members and the pinion so that the desired accuracy of movement between the rack bar and the pinion cannot be obtained, especially since there is a tendency on the part of the shaft to flex intermediately of its ends due to the wide spacing of its bearings. Thus if there is any lost motion between the rack bar and the pinion on the drum shaft the rotation of the drum will not be proportionate to the travel of the rack bar, against spring or weight resistance, in response to applied weights on the scale.

To overcome this condition the present invention provides the movable rack bar of a spring or weight actuated weighing scale with an adjustable guide formed to provide an arcuate edge constituting a part of a circle in which the axis of swinging movement of the rack bar forms its center, the arcuate edge of said guide being normally spaced from the rotatable drum supporting shaft at a position immediately contiguous to the rack and pinion construction and arranged on the opposite side of said shaft as regards the rack construction in order that when flexing pressures are set up on the intermediate portion of the drum shaft, through the operation of the rack and pinion mechanism such flexing of the shaft will be prevented by the contact of the shaft with the movable guide or stop member, to the end of maintaining the alignment of the shaft and constant proper registration between the interfitting teeth of the rack and gear mechanism.

A further object of the invention rests in mounting the guard or stop member directly on the movable rack bar so that the wear which is imparted to said member by the drum shaft will be distributed over the full arcuate edge of said member, instead of being concentrated upon any localized portion thereof.

With these and other objects in view which will appear as the description proceeds, the invention consists in the novel features of construction, combinations of elements and arrangements of parts hereinafter to be fully described and pointed out in the appended claims.

In the accompanying drawings:

Figure 1 is a vertical sectional view taken through a weighing scale formed in accordance with the present invention, Figure 2 is an enlarged view mainly in side elevation of a pivoted rack bar provided with the guard member comprising the present invention, Figure 3 is a detail horizontal sectional view on the line 3—3 of Figure 2, Figure 4 is an enlarged detail view showing the relationship between the guard member, the rack bar and the drum shaft, and Figure 5 is a detail view illustrating the drum shaft in front elevation with the computing drums or charts carried thereby.

In the accompanying drawings there has been disclosed a so-called computing type of weighing scale. While the specific type of scale illustrated very clearly discloses the features of the present invention yet it will be understood that the latter in its broader aspects is not limited in application to any particular type of scale but may be used in any scale construction employing a drum shaft mechanism, operating in response to applied weights on the scale for rotating the shaft and the drum or drums carried thereby.

The scale illustrated consists of a casing which includes a base section 1 and a removable cover section 2. Arranged above the cover section is a weight receiving platform 3, which is supported by means of depending stems 4. The lower ends of these stems engage within rests provided in connection with the outer ends of a pair of levers 5—5 which are pivotally mounted as at 6 in connection with the base section 1. The levers 5 are of the so-called compound type and the inner ends thereof are connected by an articulate link connection 7. The coil spring 8 is connected at its lower end with the base section and at its upper end with one of the levers 5 so that oscillatory movement on the part of said levers, in response to the application of weights to the platform 3, is yieldably resisted. Pivotally supported within the base section 1 as at 9 is an elongated drum actuating arm 10. This arm is connected by a thermostatic link 11 with one of the levers 5, so that as said levers move against the resistance of the spring 8 and through various increments of travel in response to the weights applied to the platform 3, the arm 10 will be oscillated in proportional degrees of travel. A weight 10' is connected to the arm 10 and located on the side of the pivot 9 opposite that of the arm to counterbalance the weight of the arm. The thermostatic link or element which serves to compensate for temperature changes has been described and claimed in my co-pending application Serial No. 283,620 and filed June 7, 1928, now Patent 1,804,053 issued May 5, 1931, and therefore a detailed description thereof in this case is thought unnecessary.

Supported in spaced bearings 12 carried by the base section 1 is a longitudinally extending drum shaft 13, which extends substantially across the full width of the casing and carries a pair of longitudinally spaced weight indicating and price computing drums 14. Between the drums 14 and fixed to the shaft 13 is a pinion 15 which is normally engaged by an arcuate toothed rack 16 pivotally carried as at 17 by the outer yoke-shaped end 18 of the arm 10. The rack 16 is preferably weighted as at 19 so that its toothed surface will be positively held in contact with the teeth of the pinion 15. The lower end of the rack 16, as shown in Figure 4, is slotted as at 20 for the reception of a pin 21 carried by the yoke-shaped end 18 of the arm 10. The slot is slightly larger than the diameter of the pin 21 to provide for limited play on the part of the rack 16 so as to avoid excessive tooth friction.

It will be seen that as the arm 10 oscillates, carrying with it the arcuate rack 16, considerable stress will be imparted to the unsupported central portion of the shaft 13 and the reaction of these pressures is to cause the pinion to move away from the teeth of the rack 16 by the flexing of the shaft 13. The shaft is of relatively small diameter since the drums 14 carried thereby are of very light weight construction, and unless flexing of the shaft were positively prevented the rack and gear mechanism would not be sufficiently positive in operation to permit of its use in precision instruments such as weighing scales. It has been proposed heretofore to prevent such flexing of the drum shaft by stationary guides carried in connection with the base of the scale. However, it will be noted that in such constructions the drum shaft engages with the fixed guide constantly at their registering surfaces with the result that the guide is apt to wear excessively along that localized portion thereof in registration with the drum shaft permitting the very conditions to exist in relation to gear registration which the guide was intended to prevent. Therefore, in accordance with the present invention the yoke-shaped end 18 of the arm 10 is provided with a steel guide member 22 which is carried in connection with the arm 10 by means of fixed screws 23, which prevent movement of the guide member relative to its supporting arm 10. The guide member is formed with an arcuate surface 24 which constitutes a portion of a circle of which the pivotal axis 9 of the arm 10 constitutes the center. The surface 24 is preferably slightly spaced from the shaft 13, as shown in Figure 4, so that it does not rub or bind the shaft and, of course, the guide member is placed on the opposite side of the shaft 13 as regards the rack 16.

It will be seen that in operation when the shaft 13 tends to flex under the pressures applied thereto by the rack 16, and to thereby cause improper tooth engagement between the rack 16 and the pinion 15, such a tendency on the part of the shaft will be neutralized or precluded by the operating position of the guide member 22. A slight flexing of the shaft to an extent insufficient to have any effect on the proper tooth engagement between the pinion 15 and the rack 16, is checked by the engagement of the shaft with the arcuate edge 24 of the guide member. This engagement may take place at any point along the full length of the edge 24 so that the wear will not be localized but will be distributed over the entire edge of the guide member so as to be practically unnoticeable. By this arrangement accuracy in tooth engagement is preserved throughout the life of the scale insofar as the operation of the rack and pinion mechanism is concerned.

What is claimed is:

1. In a weighing scale, a housing, a shaft, bearings carried by said housing for the rotatable reception of the outer ends of said shaft, spaced drums carried by said shaft and rotatable in unison therewith, a pinion fixed to said shaft between said drums, a pivotally mounted arm arranged within said housing, an arcuate rack bar carried by said arm and arranged in engagement with the teeth of said pinion, and an arcuate guard member carried by said arm and arranged adjacent to said shaft on the opposite side of the latter as regards said rack bar.

2. In a weighing scale, a housing, a drum shaft rotatably supported at its ends in connection with said housing, a pinion fixedly mounted on said shaft, an arm pivotally mounted in connection with said housing and having its outer end provided with an arcuate rack bar arranged to engage with said pinion, and a guard member fixed to said arm for movement in unison therewith, said member being provided with an arcuate edge arranged for co-operation with said shaft to maintain the teeth of said pinion and rack bar in a constant operative relationship.

In testimony whereof I affix my signature.

NATHAN A. HALLWOOD.